United States Patent [19]

Taira et al.

[11] Patent Number: 5,032,557

[45] Date of Patent: Jul. 16, 1991

[54] THERMAL SPRAY MATERIAL AND AND THERMAL SPRAYED MEMBER USING THE SAME

[75] Inventors: Hatsuo Taira, Himeji; Masakazu Ikeda, Kitakyushu; Yoshio Harada, Akashi; Hiroshi Hagiwara, Urawa, all of Japan

[73] Assignees: Tocalo Co., Ltd., Kobe; Onoda Cement Co., Ltd., Onoda, both of Japan; a part interest

[21] Appl. No.: 547,696

[22] Filed: Jul. 2, 1990

[51] Int. Cl.$^5$ ............................................. C04B 35/48
[52] U.S. Cl. .................................... 501/135; 501/103; 501/123; 428/633
[58] Field of Search ....................... 501/104, 123, 135; 427/633

[56] References Cited

U.S. PATENT DOCUMENTS

| | | | |
|---|---|---|---|
| 4,106,947 | 8/1978 | Recasens et al. | 501/107 |
| 4,588,655 | 5/1986 | Kushner | 428/633 |
| 4,645,716 | 2/1987 | Harrington et al. | 428/633 X |
| 4,774,150 | 9/1988 | Amann et al. | 428/633 X |
| 4,900,640 | 2/1990 | Bell et al. | 428/633 |

FOREIGN PATENT DOCUMENTS 55-113880  9/1980  Japan .
56-54905   5/1981  Japan .
58-87273   5/1983  Japan .

*Primary Examiner*—Karl Group
*Attorney, Agent, or Firm*—Frishauf, Holtz, Goodman & Woodward

[57] ABSTRACT

The present invention relates to a novel thermal spray material in any one of the forms of a particle mixture material, a granule material, and an electric fused material of $2CaO \cdot SiO_2$ and $CaO \cdot ZrO_2$. As $2CaO \cdot O \cdot SiO_2$, $\gamma$-$2CaO \cdot SiO_2$ is used. The ratio of $\gamma$-$2CaO \cdot SiO_2$ to $CaO \cdot ZrO_2$ is specified by weight %. This invention relates also to a thermal sprayed member formed by thermal spraying this thermal spray material on a thermal resistant substrate.

5 Claims, 1 Drawing Sheet

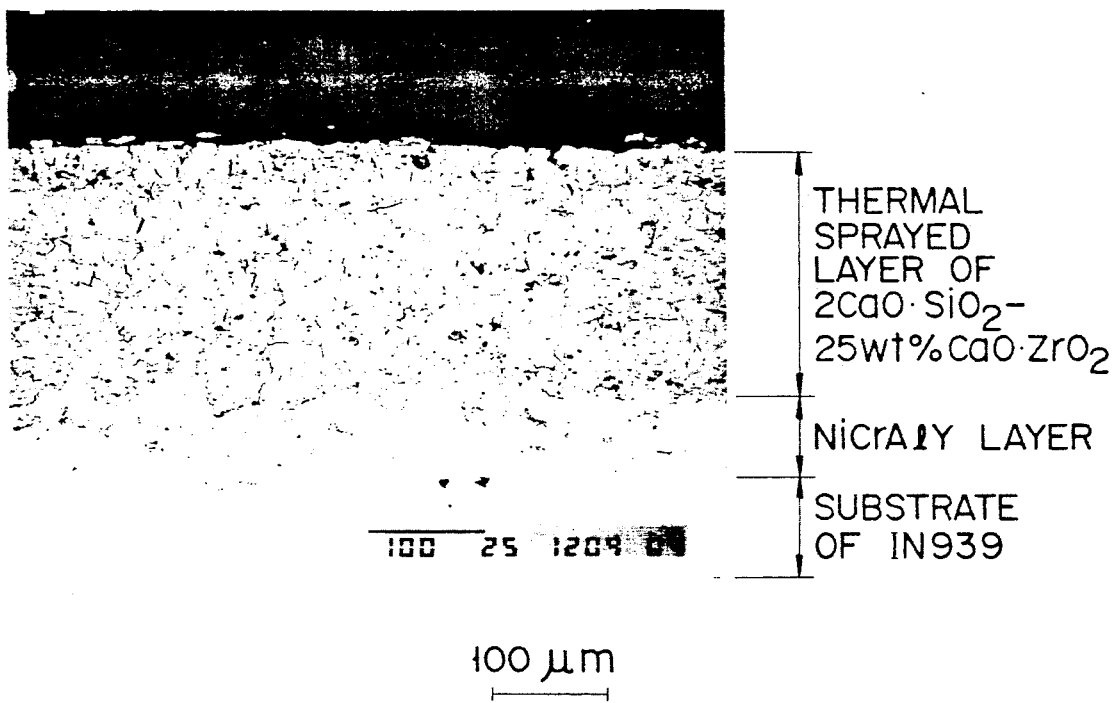

THERMAL SPRAY MATERIAL AND AND THERMAL SPRAYED MEMBER USING THE SAME

BACKGROUND OF THE INVENTION

1. Field of the Invention

The present invention relates to a thermal spray material having excellent corrosion resistance and heat resistance, and a thermal sprayed member formed by spraying the thermal spray material on the surface of a metallic member.

2. Description of the Prior Art

Recently, very excellent high-temperature properties are required for a heat resistant/corrosion resistant member such as a gas turbine blade. The efficiency of the operation of the gas turbine increases in accordance with the rise in operation temperature. Under the situation, the rise in operation temperature is always demanded. To meet the demand, there has been developed a heat resistant, corrosion resistant and creep resistant ceramic material, such as SiC or $Si_3N_4$. This material, however, has unsatisfactory impact strength and thermal shock resistance, and is unreliable as material of parts of the gas turbine. At present, therefore, the gas turbine is formed of a material consisting mainly of a Ni-base alloy or a Co-base alloy. The working temperature of this type of heat resistant material is limited to 1000° C. When this heat resistant material is used as that of parts of the gas turbine, the parts are cooled in use, the parts are thermal barriered, or other methods are employed. According to one method of barriering the parts from heat, the metal substrate of the parts is coated with ceramic layers, thereby preventing the rise in temperature of the substrate. In this process, ceramic particles having a low thermal conductivity, a high thermal shock resistance and a high radiation coefficient have conventionally been employed as a thermal spray material. More specifically, the employed ceramic material is, for example, yttria stabilized zirconia (YSZ). Even if the layer of thermal spray material is sprayed on the part of the gas turbine, it may be peeled off the substrate owing to the heat cycle in which rapid heating and rapid cooling is alternately performed. As a result, the thermal barrier function of the sprayed part is lost. In addition, this type of spray material is expensive, resulting in a rise in manufacturing cost.

In general, the thermal sprayed layer tends to be peeled off the substrate owing to the heat cycle in which rapid heating and rapid cooling is repeated. It is thus desirable that the thermal spray material have not only a low thermal conductivity, but also a thermal expansion coefficient close to that of the substrate. The materials meeting these requirements have been widely developed. In addition, there are proposed a technique of providing an intermediate layer formed of a mixture of metal and ceramics, on the metal substrate (Published Unexamined Japanese Patent Application No. 55-113880), a technique of subjecting a ceramic layer, which is thermal sprayed on the metal, to a heat treatment at high temperature and for a long time, thereby producing micro-cracks in the ceramic layer (Published Unexamined Japanese Patent Application No. 56-54905), and a technique of rapidly cooling the formed ceramic layer thereby producing micro-cracks therein (Published Unexamined Japanese Patent Application No. 58-87273).

However, even if the intermediate layer of metal and ceramics is provided, the corrosion resistance and thermal shock resistance is not enhanced satisfactorily. In addition, even if micro-cracks are produced in the ceramic layer by heating or rapid cooling, the corrosion resistance and thermal shock resistance is not enhanced satisfactorily, while the number of manufacturing process is increased.

SUMMARY OF THE INVENTION

An object of the present invention is to provide a thermal spray material having excellent heat resistance and corrosion resistance. Another object of this invention is to provide a thermal sprayed member formed by thermal spraying the surface of a metal substrate with the thermal spray material having excellent heat resistance and corrosion resistance. Still another object of the invention is to provide a part of a gas turbine formed by thermal spraying the surface of a metal substrate with the thermal spray material having excellent heat resistance and corrosion resistance.

In order to achieve the above objects, there is provided a thermal spray material consisting of $2CaO \cdot SiO_2$ and $CaO \cdot ZrO_2$. As $2CaO \cdot SiO_2$, $\gamma$-$2CaO \cdot SiO_2$ is used. The ratio of $\gamma$-$2CaO \cdot SiO_2$ to $CaO \cdot ZrO_2$ is 60–95 wt % : 5–40 wt %. In addition, there is provided a thermal sprayed member obtained by forming a high temperature resistance/corrosion resistance metal spraying layer on a heat resistant substrate, the high temperature resistance/corrosion resistance properties of said metal spraying layer being equal to or higher than those of said heat resistant substrate, and by thermal spraying the resultant with a thermal spray material consisting of 60–95 wt % of $\gamma$-$2CaO \cdot SiO_2$ and 5–40 wt % of $CaO \cdot ZrO_2$. Furthermore, there is provided a part of a gas turbine formed of a thermal sprayed member. The present invention can provide an inexpensive thermal spray material having excellent heat resistance and corrosion resistance. The thermal spray material is sprayed on the surface of, e.g. a part of a gas turbine made of heat resistant metal, thereby obtaining a thermal sprayed member having excellent heat resistance and corrosion resistance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates presently preferred embodiments of the invention and, together with the general description given above and the detailed description of the preferred embodiments given below, serves to explain the principles of the invention.

Figure is a photograph obtained by a scanning electron microscope, showing a cross-sectional view of a thermal sprayed member of test No. 13 (as a thermal spray material, 75 wt % of $2CaO \cdot SiO_2$ and 25 wt % of $CaO \cdot ZrO_2$ is employed).

DETAILED DESCRIPTION OF THE PREFERRED EMBODIMENTS

In the present invention, $2CaO \cdot SiO_2$ and $CaO \cdot ZrO_2$ are used as a thermal spray material. Of these, $2CaO \cdot SiO_2$ is of the $\gamma$ type. There are known various types of crystals of $2CaO \cdot SiO_2$. In this invention, $2CaO \cdot SiO_2$ having an anti-slaking property is preferable. Thus, in this invention, $\gamma$ type $2CaO \cdot SiO_2$ is used. The ratio of $2CaO \cdot SiO_2$ and $CaO \cdot ZrO_2$ is 60-95% by weight : 5-40% by weight. When $2CaO \cdot SiO_2$ is less than 60% by weight, the balance or $CaO \cdot ZrO_2$ exceeds 40% by weight. As a result, the thermal sprayed layer having a lower thermal expansion coefficient may possibly be exfoliated the substrate on which the thermal sprayed layer is formed. In addition, when this material is used to apply a gas turbine blade, a thermal sprayed layer having a high reactivity with corrosive gas, such as vanadium, contained in fuel or the like, may be damaged by reaction. On the other hand, when $2CaO \cdot SiO_2$ exceeds 95% by weight (in this case, the balance or $CaO \cdot ZrO_2$ is less than 5% by weight), the thermal stability of the thermal sprayed layer lowers undesirably. A more desirable ratio of $2CaO \cdot SiO_2$ to $CaO \cdot ZrO_2$ is 60-90% by weight : 10-40% by weight. A still more desirable ratio of $2CaO \cdot SiO_2$ to $CaO \cdot ZrO_2$ is 70-80% by weight : 20-30% by weight.

The thermal spray material of the present invention may be prepared by simply mixing particles of both $2CaO \cdot SiO_2$ and $CaO \cdot ZrO_2$. In this case, the average particle size is 20 to 40 $\mu$m. The mixture of particles may be also granulated to prepare the thermal spray material. To obtain granules, $2CaO \cdot SiO_2$ and $CaO \cdot ZrO_2$ is powdered, for example, in a ball mill, to an average particle size of 1 to 3 $\mu$m. The powder is mixed with 2 to 5% by weight of polyvinyl alcohol as a binder. The resultant mixture is dried by means of a thermal spray drier, thus obtaining granules of average particle size of 20 to 40 $\mu$m.

It is also possible to prepare the thermal spray material from $2CaO \cdot SiO_2$ and $CaO \cdot ZrO_2$ in the form of an electric fused material. In order to form the electric fused material, $2CaO \cdot SiO_2$ and $CaO \cdot ZrO_2$ is melted, e.g., in an electric fuse furnace at a temperature of 2000° C. or more, and then cooled and pulverized to an average particle size of 20 to 40 $\mu$m. Thus, the thermal spray material is obtained.

As has been described above, the thermal spray material of the present invention may be prepared in three forms: a mixture, granules, and an electric fused material. Of these, the granules have the highest thermal shock resistance. The electric fused material has the second highest thermal shock resistance, and the mixture has the lowest thermal shock resistance.

When a thermal sprayed member formed by thermal spraying the thermal spray material of this invention on a substrate is used in a corrosive gas including vanadium and sulfur component, the thermal sprayed layer prevents direct contact between the substrate and the corrosive gas. In addition, the thermal sprayed layer absorbs corrosive gas, and prevents the corrosive gas from diffusing into the substrate. Furthermore, CaO in the thermal sprayed layer reacts with a vanadium compound to produce a high melting point compound such as $3CaO \cdot V_2O_5$, thus further preventing corrosion.

According to the invention described above, a metal spray layer is formed on a metal substrate of Ni-base alloy or a Co-base alloy, and the thermal spray material is thermal sprayed on the metal spray layer. In this case, the high temperature resistance/corrosion resistance properties of the metal spray layer are equal to or higher than those of the metal substrate. Examples of the metal spraying materials are: NiCrAlY, CoCrAlY, CoNiCrAlY, NiCoCrAlY, NiCr, NiAl, and Ni-Cr-Al alloy.

Experiments relating to the present invention will now be described.

As a substrate, a nickel-base alloy (IN 939) (Cr: 22.5%, Co: 19.0%, W: 2.0%, Ti: 3.7%, Al: 1.9%, Ta: 1.4%, Nb: 1.0%, Ni: balance) of the size of $50 \times 50 \times 5$ mm was used. The surface of the nickel-base alloy was subjected to sandblast under a pressure of 4.5 kg/cm² and at a blast distance of 150 mm, with use of #24 alumina (JIS R 6001). Thereafter, a metal spray layer of NiCrAlY alloy is formed on the sandblasted nickel-base alloy to a thickness of 100 $\mu$m by means of low pressure plasma spraying. Further, various ceramic materials, as shown in Table 1, are sprayed by means of atmospheric plasma spraying, thus obtaining test samples. The test samples are rapidly heated for ten minutes at a temperature of 1100° C., and are then rapidly cooled for ten minutes at room temperature. This thermal shock is repeated, to find the number of the heating/cooling cycles which causes peeling of the ceramic layers. The results are shown in Table 1.

TABLE 1

| No. | Thermal spray material | Form of thermal spray material | Number of heating/ cooling cycles until exfoliation |
|---|---|---|---|
| 1 | $ZrO_2$ - 8 wt % MgO | | 5 |
| 2 | $ZrO_2$ - 24 wt % MgO | | 7 |
| 3 | $ZrO_2$ - 4 wt % CaO | | 5 |
| 4 | $ZrO_2$ - 7 wt % CaO | | 7 |
| 5 | $CaO.ZrO_2$ | | 11 |
| 6 | $ZrO_2$ - 4 wt % $Y_2O_3$ | | 6 |
| 7 | $ZrO_2$ - 8 wt % $Y_2O_3$ | | 11 |
| 8 | $ZrO_2$ - 25 wt % $Y_2O_3$ | | 5 |
| 9 | $2CaO.SiO_2$ | | 10 |
| 10 | $2CaO.SiO_2$ - 3 wt % $CaO.ZrO_2$ | Granules material | 17 |
| 11 | $2CaO.SiO_2$ - 5 wt % $CaO.ZrO_2$ | Granules material | 17 |
| 12 | $2CaO.SiO_2$ - 10 wt % $CaO.ZrO_2$ | Granules material | 18 |
| 13 | $2CaO.SiO_2$ - 25 wt % $CaO.ZrO_2$ | Granules material | 30 |
| 14 | $2CaO.SiO_2$ - 25 wt % $CaO.ZrO_2$ | Electric fused material | 29 |
| 15 | $2CaO.SiO_2$ - 25 wt % $CaO.ZrO_2$ | Particle mixture material | 27 |
| 16 | $2CaO.SiO_2$ - 40 wt % $CaO.ZrO_2$ | Granules material | 20 |
| 17 | $2CaO.SiO_2$ - 45 wt % $CaO.ZrO_2$ | Granules material | 11 |
| 18 | $2CaO.SiO_2$ - 50 wt % $CaO.ZrO_2$ | Granules material | 4 |

As seen from Table 1, thermal spray materials Nos. 5, 7, 9, and 10 to 17 were peeled in the thermal shock tests after ten or more heating/cooling cycles, and it was found that these samples showed good thermal shock resistance properties. As to the form of the thermal spray material, the thermal shock resistance properties increased in the order of granules, electric fused material, and mixture. Figure is a photograph taken by a scanning electron microscope, which shows the cross-sectional view of thermal spray material No. 13 (75 wt % of $2CaO \cdot SiO_2$ and 25 wt % of $CaO \cdot ZrO_2$), before it was subjected to the test. As seen from Figure, the thermal spray material includes many micro-cracks extending in the vertical direction and other directions.

As will be described later, thermal spray materials Nos. 5, 7, 9, 10 and 17, though having good thermal shock resistance properties, are not excellent in corrosion resistance properties. Therefore, these materials are excluded from the range of the present invention.

Corrosion resistance tests were conducted only with respect to the materials showing good thermal shock resistance properties. The thermal sprayed specimens were applied with a corrosive substance of 85% $V_2O_5$-15% $Na_2SO_4$ at an amount of 20 mg/cm$^2$, and were heated for four hours at a temperature of 1100° C. Regarding the resultant specimens, the occurrence/non-occurrence of peeling of the thermal sprayed layer and the thickness of the reaction layer in the thermal sprayed layer which reacts with the corrosive substance were examined by means of an EPMA.

TABLE 2

| No. | Thermal spray material | Occurrence/Non-occurrence of Exfoliation | Thickness of reaction layer ($\mu$m) |
|---|---|---|---|
| 5 | $CaO.ZrO_2$ | Exfoliation entire surface | — |
| 7 | $ZrO_2$ - 8 wt % $Y_2O_3$ | Exfoliation entire surface | — |
| 9 | $2CaO.SiO_2$ | No exfoliation | 100 |
| 10 | $2CaO.SiO_2$ - 3 wt % $CaO.ZrO_2$ | No exfoliation | 80 |
| 11 | $2CaO.SiO_2$ - 5 wt % $CaO.ZrO_2$ | No exfoliation | 40 |
| 12 | $2CaO.SiO_2$ - 10 wt % $CaO.ZrO_2$ | No exfoliation | 20 |
| 13 | $2CaO.SiO_2$ - 25 wt % $CaO.ZrO_2$ | No exfoliation | 10 |
| 16 | $2CaO.SiO_2$ - 40 wt % $CaO.ZrO_2$ | No exfoliation | 40 |
| 17 | $2CaO.SiO_2$ - 45 wt % $CaO.ZrO_2$ | No exfoliation | 90 |

As is seen from Table 2, the thermal sprayed layers of specimens Nos. 5 and 7 were peeled in the experiments, and it was found that specimens Nos. 5 and 7 were practically undesirable. Regarding specimens Nos. 9, 10 and 17, the thickness of the reaction layer in the thermal sprayed layer which reacts with the corrosive substance was thick, e.g. 80 to 100 $\mu$m, and it was found that specimens Nos. 9, 10 and 17 did not have sufficient corrosion resistance. Therefore, thermal spray materials Nos. 11, 12, 13 and 16 are satisfactory both in thermal shock resistance and hot-corrosion resistance.

EXAMPLE 1

A power generator gas turbine, employed in this example, uses fuel oil containing, as corrosive component, 1-2% of sulfur, 10-18 ppm of vanadium, and 3-10 ppm of sodium. The turbine has a first-stage stationary blade made of Co-base alloy (Cr 22.5%; Ni 10.5%; W 7.5%; Fe 2.0%; and the balance being Co), and a second-stage stationary blade made of Ni-base alloy (Cr 19%; Co 18%; Mo 4%; Ti 2.9%; Al 2.9%; the balance being Ni). A layer of CoCrAlY alloy having a thickness of 0.1 mm was metal sprayed on the first-stage and second-stage stationary blades by means of low pressure plasma spraying. A layer of granules (average particle size: 30 $\mu$m) of $2CaO \cdot SiO_2$ - 10 wt % $CaO \cdot ZrO_2$, having a thickness of 0.2 mm, and a layer of granules (average particle size: 30 $\mu$m) of $2CaO \cdot SiO_2$ - 25 wt % $CaO \cdot ZrO_2$' having a thickness of 0.2 mm, were plasma sprayed on the CoCrAlY layer. The turbine thus obtained was used for one year under the condition that the gas temperature at the entrance of the turbine was 1100° C. It was found that the plasma sprayed layer was not exfoliation, and the turbine operated with no problem.

EXAMPLE 2

A metal spray layer of NiCrAlY alloy, having a thickness of 0.15 mm, was formed, by means of low pressure plasma spraying, on the inner surface of a burner made of Ni-base alloy (Cr 22.0%; Mo 9.0%; Fe 18.5%; Co 1.5%; the balance being Ni) of the same power generator gas turbine as was used in Example 1. Layers of thermal spray materials of samples Nos 9 and 11 shown on Table 2, each having a thickness of 0.3 mm, were formed on the NiCrAlY layer by means of plasma spraying in the atmosphere. The inner surface of this burner was used for one year in the combustion chamber having a temperature of 1150° C. to 1300° C. No abnormality was found in the thermal sprayed layer of sample No. 11, and the burner was driven with no problem. By contrast, regarding the thermal sprayed of sample No. 9, the thickness of the reaction layer in the thermal sprayed layer which reacts with the corrosive substance was thick, and the thermal sprayed layer was partly exfoliated. In addition, part of the NiCrAlY layer was exfoliated.

Additional advantages and modifications will readily occur to those skilled in the art. Therefore, the invention in its broader aspects is not limited to the specific details, or the specific examples described herein. Accordingly, various modifications may be made without departing from the spirit or scope of the general inventive concept as defined by the appended claims and their equivalents.

What is claimed is:

1. A thermal spray material consisting of 60-95 wt % of $\gamma$-$2CaO \cdot SiO_2$ and 5-40 wt % of $CaO \cdot ZrO_2$.

2. A thermal spray material consisting of 60-90 wt % of $\gamma$-$2CaO \cdot SiO_2$ and 10-40 wt % of $CaO \cdot ZrO_2$.

3. The thermal spray material according to claim 1 wherein the thermal spray material has any one of the forms of a particle mixture material, a granule material, and an electric fused material of $\gamma$-$2CaO \cdot SiO_2$ and $CaO \cdot ZrO_2$.

4. The thermal spray material according to claim 3, wherein the average particle size of any of said materials is 20 to 40 $\mu$m.

5. The thermal spray material according to claim 2, wherein the thermal spray material has any one of the forms of a particle mixture material, a granule mixture, and an electric fused material of $\gamma$-$2CaO \cdot SiO_2$ and $CaO \cdot ZrO_2$.

* * * * *

UNITED STATES PATENT AND TRADEMARK OFFICE
CERTIFICATE OF CORRECTION

PATENT NO. : 5,032,557
DATED : July 16, 1991
INVENTOR(S) : TAIRA et al

Page 1 of 2

It is certified that error appears in the above-identified patent and that said Letters Patent is hereby corrected as shown below:

Title page:

Section [54] - change "THERMAL SPRAY MATERIAL AND AND...",
     to --THERMAL SPRAY MATERIAL AND.....--.

Section [57] Abstract, line 4, change "$2CaO \cdot O \cdot SiO_2$," to --$2CaO \cdot SiO_2$,--.

Column 1, line 1, after "MATERIAL", delete one "AND".

Column 4, Table 1, No.5, change "$CaO.ZrO_2$" to --$CaO \cdot ZrO_2$--.

Column 4, Table 1, No.9, change "$2CaO.SiO_2$" to --$2CaO \cdot SiO_2$--.

Column 4, Table 1, Nos. 10 - 18, change "$CaO.ZrO_2$" to --$CaO \cdot ZrO_2$--, and
   "$2CaO.SiO_2$" to --$2CaO \cdot SiO_2$--.

Column 5, Table 2, No.5, change "$CaO.ZrO_2$" to --$CaO \cdot ZrO_2$--.

UNITED STATES PATENT AND TRADEMARK OFFICE
CERTIFICATE OF CORRECTION

PATENT NO. : 5,032,557
DATED : July 16, 1991
INVENTOR(S) : TAIRA et al

It is certified that error appears in the above-identified patent and that said Letters Patent is hereby corrected as shown below:

Column 5, Table 2, No.9, change "$2CaO.SiO_2$" to --$2CaO \cdot SiO_2$--.

Column 5, Table 2, Nos. 10 - 17,

Change "$CaO.ZrO_2$" to --$CaO \cdot ZrO_2$--, and

"$2CaO.SiO_2$" to --$2CaO \cdot SiO_2$--.

Column 6, line 60, (Claim 5), change "a granule mixture," to --a granule material,--.

Signed and Sealed this

Tenth Day of August, 1993

Attest:

MICHAEL K. KIRK

Attesting Officer    Acting Commissioner of Patents and Trademarks